United States Patent [19]

Peddinghaus

[11] Patent Number: 4,667,383
[45] Date of Patent: May 26, 1987

[54] MACHINE FOR PROCESSING STRUCTURAL SHAPES

[76] Inventor: Rolf Peddinghaus, Deterbergerstr. 25, 5828 Ennepetal, Fed. Rep. of Germany

[21] Appl. No.: 547,743

[22] Filed: Nov. 1, 1983

[30] Foreign Application Priority Data

Sep. 3, 1983 [DE] Fed. Rep. of Germany ....... 3331844

[51] Int. Cl.[4] ............................................. B23P 23/04
[52] U.S. Cl. ..................................... 29/26 A; 29/564; 266/160
[58] Field of Search ..................... 29/26 A, 450, 564; 266/160, 72, 73, 61, 65; 408/37, 39, 10, 11, 13; 409/149, 155; 198/572, 575

[56] References Cited

U.S. PATENT DOCUMENTS

| | | | |
|---|---|---|---|
| 2,619,707 | 12/1952 | Young et al. | 266/61 X |
| 2,685,443 | 8/1954 | Rath | 266/73 |
| 3,094,015 | 6/1963 | Mead | 408/39 X |
| 3,584,523 | 6/1971 | Evans | 408/37 |
| 3,977,804 | 8/1976 | Kitagawa | 408/39 X |
| 4,063,059 | 12/1977 | Brolund et al. | 266/65 X |
| 4,077,448 | 3/1978 | Hasenwinhle et al. | 409/149 X |
| 4,121,808 | 10/1978 | Cardea | 266/160 X |
| 4,179,230 | 12/1979 | Kitagawa | 408/39 |
| 4,330,110 | 5/1982 | Creech | 266/73 X |
| 4,413,662 | 11/1983 | Gregoire et al. | 198/572 X |
| 4,449,986 | 5/1984 | Held | 409/155 X |

FOREIGN PATENT DOCUMENTS

2742072 1/1985 Fed. Rep. of Germany ..... 29/26 A

*Primary Examiner*—Gil Weidenfeld
*Assistant Examiner*—Glenn L. Webb
*Attorney, Agent, or Firm*—Karl F. Ross; Herbert Dubno

[57] ABSTRACT

A drilling machine for heavy steel structural shapes (e.g. profiles such as I-beams) has one or more of the drill carriages provided with a cantilever arm carrying a burner which is also operated by the numeral controller of the drilling machine. The latter receives a displacement measuring input from an additional detector associated with the drive which may be spaced from the drills in the direction of feed of the I-beam on a roller conveyor to permit burner cutting of the drilling end of the I-beam. The two drives may be synchronized by a universal joint shaft.

2 Claims, 4 Drawing Figures

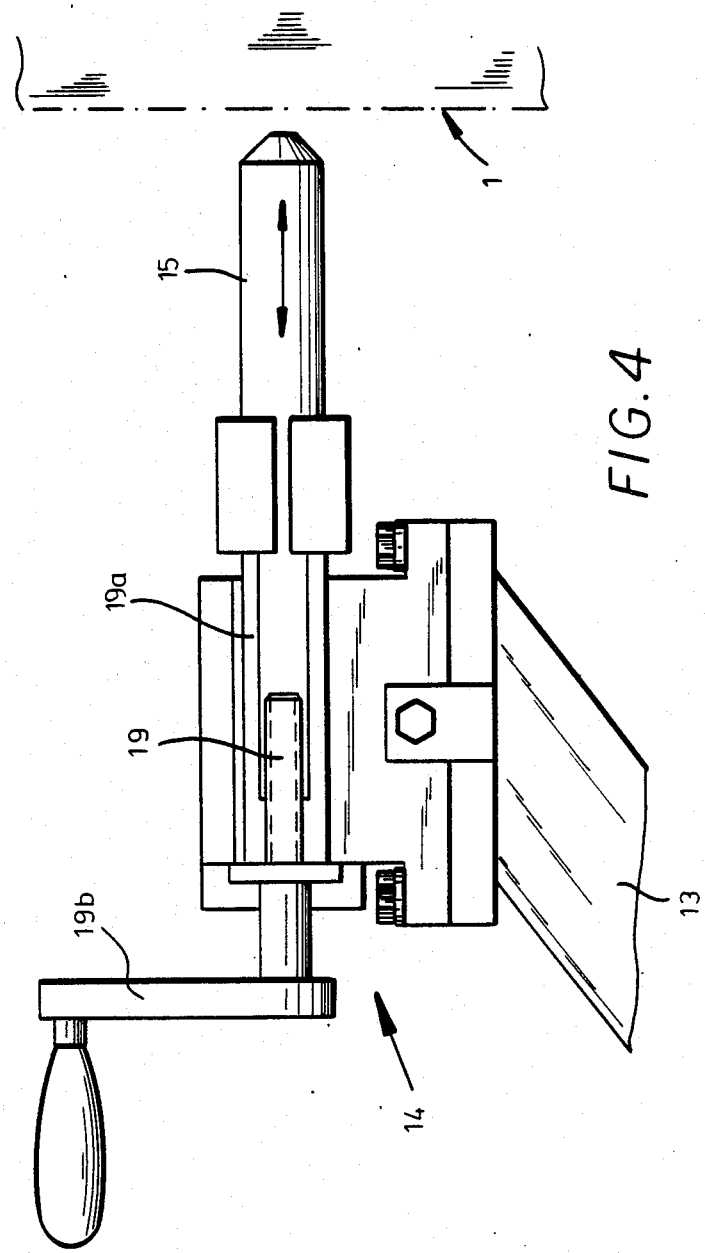

MACHINE FOR PROCESSING STRUCTURAL SHAPES

FIELD OF THE INVENTION

My present invention relates to an apparatus for processing structural shapes and, more particularly, for making holes, openings, cutouts, bevels or like patterns in a structural shape or profile beam, i.e. a steel profile and especially heavy profiles such as I-beams, H-beams and the like.

BACKGROUND OF THE INVENTION

It is known to provide a preprogrammed machine, operated by numerical control (CNC or Computer Numerical Control) or other computerized digital programming technology for the production of bores or holes in I-beams and like structural shapes, especially heavy steel structural shapes, also known as profiles. Such a machine can be used to provide the holes in the flanges and/or web of the structural shape through which bolts or rivets may be inserted in the assembly of the I-beam with other beams and the like.

A machine of this type can comprise a portal-like frame having vertical frame members and a horizontal yoke which can span opposite heads of the I-beam over the latter. Roller means or the like can be provided to guide the frame along the I-beam or the I-beam through the frame and a feed unit can be provided between the frame and the I-beam to effect such relative displacement longitudinally of the I-beam.

To provide an output of this relative displacement, displacement measuring means is provided which can have a digital output generating signals for the programming unit. At least one vertical member and, if desired, the horizontal member of the frame are provided with carriages for vertical (up and down) and horizontal (back and forth) movement of drilling units which can produce the aforementioned holes.

The displacement measuring unit can be located ahead of the boring carriages or tools to provide an input representing the position of the assembly vis-a-vis the I-beam to permit drilling of the respective holes at the appropriate locations.

This apparatus has been found to be highly successful because it allows extremely precise relative displacement of I-beam and the frame, exact control of the drills and the positioning of the tools and, in general, a completely automatic robot-like or automated operation under the digital control of the programmable controller.

The feed unit and the displacement measuring unit can be embodied in various ways and, for example, the displacement measuring unit can comprise one or more measuring discs which can be rotated upon relative displacement of the frame and workpiece, to generate the position indicating signals. One of these discs can be located ahead of the tools and another behind the tools and, of course, both are connected to the programming unit for the control of the single feed unit (see German printed application—Auslegeschrift—DE-AS No. 27 42 072).

Frequently, however, it is necessary to provide so-called blockouts, cutouts or other shapes or contours in a steel beam which has transversely been provided with such holes or even which may remain free from such holes, e.g. for a building assembly of a structure from the steel beams. Such openings or patterns can include throughgoing openings through which conduits or other elements can pass or through which welding can be effected or even bevels, chamfers and the like. In the past such blockouts or cutouts have required material removal by milling or other machining techniques and the formation of them was effected entirely independently from the formation of the holes previously mentioned.

While I do not know if in practice any boring machines of the type described have been utilized for producing such cutouts or blockout patterns, it is possible to conceive of a modification of the standard boring machine described above in which the boring tools are replaced by milling cutters or other material removal tools capable of producing such blockouts. However, additional means provided for this purpose would double the cost at least of a plant for fabricating I-beams and even the modification of the boring machine would require complex control technology and might not be successful.

OBJECTS OF THE INVENTION

It is, therefore, the principal object of the present invention to provide an improved apparatus for forming cut patterns (blockouts or cutouts) on I-beams or the like whereby the disadvantages of earlier techniques are avoided without encountering the problems which would be required by the modification of earlier drilling machines in the manner described.

Another object of the invention is to improve upon a onventional drilling machine so as to make the latter more versatile.

SUMMARY OF THE INVENTION

These objects and others which will become apparent hereinafter are attained, in accordance with the invention, by providing at least one of the aforementioned carriages with a cantilever arm which is rigidly fixed at one end to one of the carriages and extends in the direction of feed or relative displacement of the frame and the I-beam, i.e. the direction of ment of the frame along the I-beam or the direction of movement of the I-beam along the frame. At the opposite end of the cantilever arm a burning cutter is provided and in the direction of feed, beyond the boring tools of the machine, a further feed unit is disposed which is synchronized with a feed unit of the boring machine and which is provided with a further displacement measurement device connected to the programmable controller so that this controller can additionally set the position of the burning head and operate the cutting burner to generate preprogrammed pattern cuts in the workpiece.

According to a preferred embodiment of the invention, the further feed unit, located in the feed direction beyond the boring tools, and the feed unit of the boring tool frame, located ahead of the boring tool frame, are synchronized by coupling them together with a common universal joint or cardan shaft.

To permit structural steel shapes of different widths or flange heights to be shaped by the cutting burner or to permit accommodation of the cutting burner and the cutting operation to fluctuation in flange and web thickness, the burner unit, head or cutting burner itself can be mounted adjustably at the free end of the respective cantilever arm so as to be shifted in horizontal direction.

It should be apparent that the further feed unit can be connected via extensions with the machine frame or can be provided on a separate foundation or base. The feed displacement measurement and programmable control are effected according to the invention so that the feeding measuring unit ahead of the boring tools and the feed measuring unit behind the boring tools in the direction of feed are activated one after the other so as to be effective in succession as control inputs.

For example, the downstream displacement measuring unit can be activated by the passage of a beam through the unit as soon as the beam has passed the upstream feed measuring unit.

For the production of a cutout at the end of such a beam, the position signals are provided by the downstream displacement measuring unit.

When the machine has three drilling heads on three drill carriages, generally each of these carriages can be provided in the aforedescribed manner with a respective cantilever arm, a burner unit and a cutting burner for operation in the manner described.

With the system of the invention, a perfectly conventional drilling machine for I-beams and other constructional shapes and its controller can be utilized to provide the cutouts or blockouts, bevels and like pattern cuts which have hitherto required special processing in an automated and highly efficient way so that cutting burners can be used in place of machining operations which are far more time-consuming. The cutting burner or burners of the invention can also be used to sever lengths of such steel beams.

By coupling the burner units with the drill carriages, highly precise cutouts and cut patterns can be ensured and since the downstream feed unit operates synchronously with the conventional upstream feed unit, the programmable control can be effective even as the beam leaves conventional parts of the drill frame for the burner cutting operation utilizing the preprogrammed data which hitherto could be utilized only for drilling operations.

BRIEF DESCRIPTION OF THE DRAWING

The above and other objects, features and advantages of the present invention will become more readily apparent from the following description, reference being made to the accompanying highly diagrammatic drawing and the following specific description which describes only those portions of the apparatus which are essential to the invention.

In the drawing

FIG. 4 is a detail view drawn to a larger scale of a modified construction of an adjusting means at the end of a cantilever arm, e.g. of the region IV shown in FIG. 1.

SPECIFIC DESCRIPTION

Figure 1:
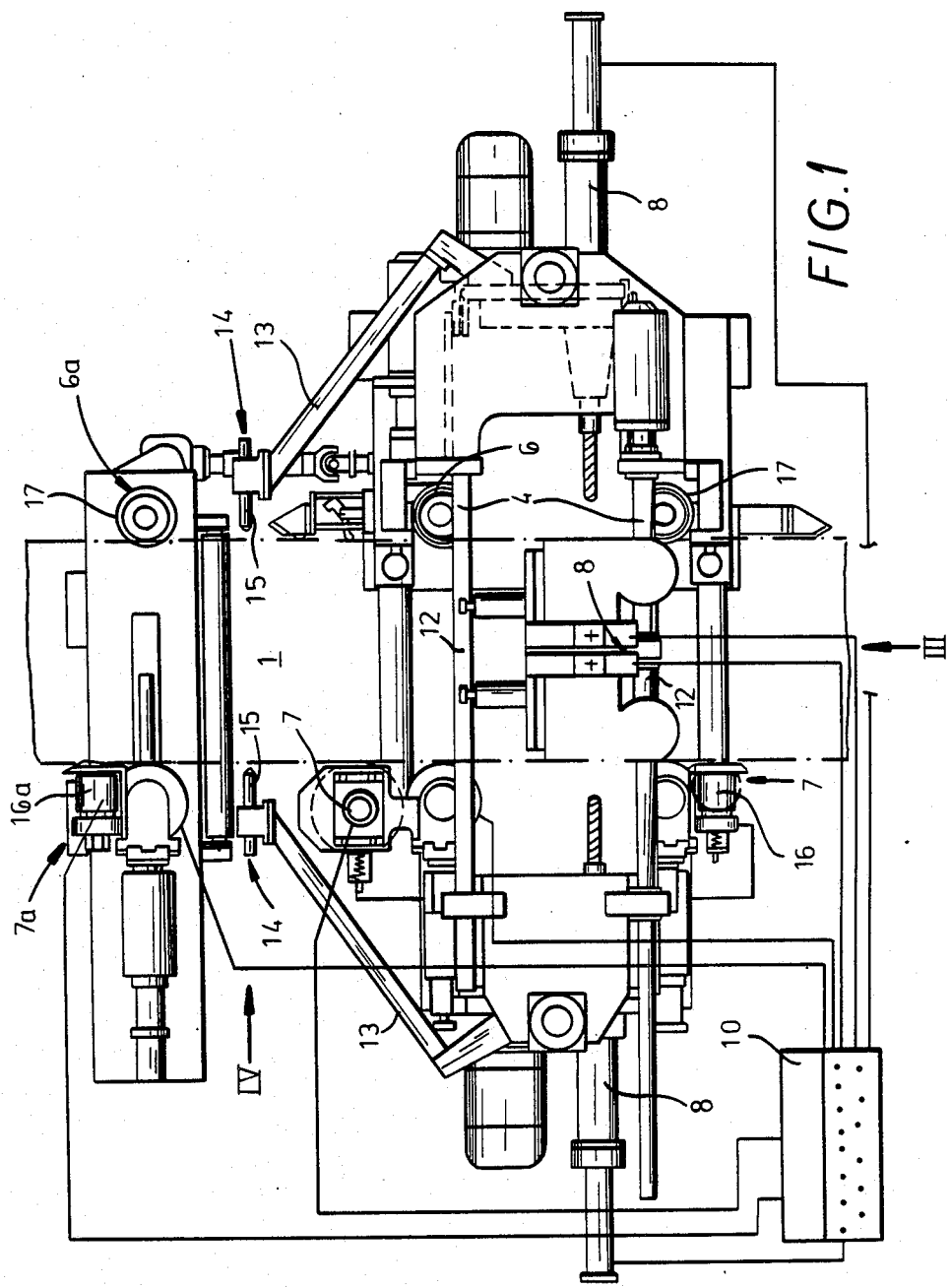
FIG. 1 is a plan view of the apparatus of the invention.

The apparatus illustrated in the drawing is shown to be set up for the formation of patterned cuts in a profile or structural steel shape in the form of an I-beam 1 which can be used for the steel frame work of a building or the like and adapted to be drilled at predetermined location to form bolt or rivet holes and to have blockouts or cutouts, bevels or like predetermined pattern formations generated therein.

The apparatus comprises a portal-like machine frame 2 which is mounted on a base 2a and has vertical frame members 3 and a horizontal upper yoke 4 which lies above the path of the I-beam. A roller conveyor can be formed by the rollers 5 to support the I-beam and in the boring machine portion of the apparatus formed with the frame 2, a feed unit is provided for advancing the I-beam. The feed unit 6 can include rollers which engage the flanges of the I-beam and which are driven by a motor not shown. The motor may be a stepping motor connected with the numerical controller 10 for controlled advance of the workpiece constituted by the I-beam.

Associated with this feed unit is a displacement measuring unit which is represented at 7 and can be considered to be provided upstream of the boring tools or bits 9.

Figure 3:
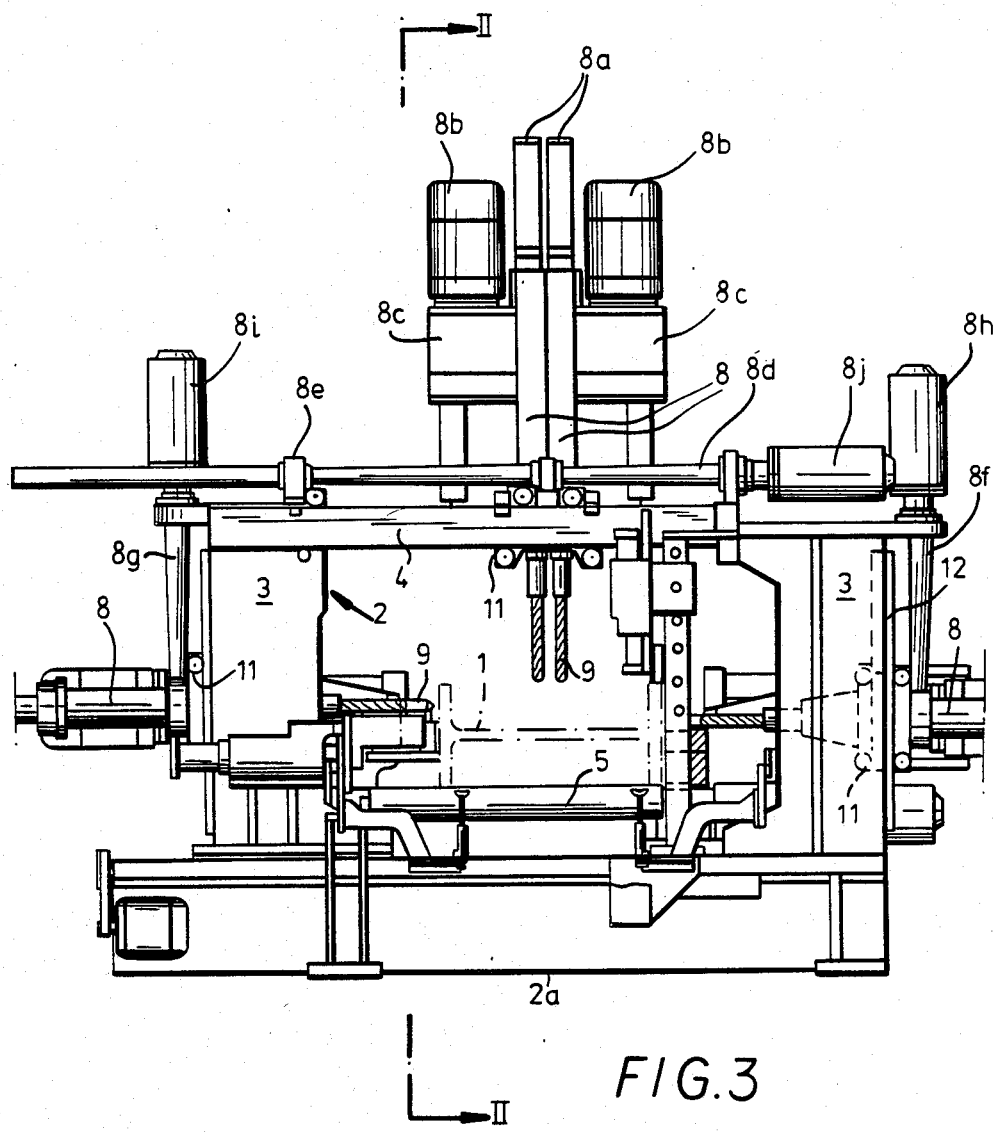
FIG. 3 is a generally inner direction of the arrow III in FIG. 1 partly broken away.

Each of the two vertical frame chambers 3 is here shown to be provided with a respective carriage 11 carrying a drying head 8 provided with a respective pair of drill bits 9. For example, the horizontally displaceable carriage 11 shown in FIG. 3 has two vertically shiftable drilling units 8, each of which is provided with a hydraulic device 8a for raising and lowering the respective drill bit 9, and with a pair of motors 8b for rotationally driving the respective drill bits by transmissions 8c which have not been illustrated in detail.

To effect the horizontal displacement of this carriage 11, a lead screw 8d is provided, the lead screw being illustrated diagrammatically as having a taper to represent a varying pitch of lead screw thread. The lead screw thread 8d also cooperates with a cut 8e connected with the left-hand upright 3 so that this upright can be shifted horizontally toward the workpiece and toward the opposite or stationary upright 3.

Additional lead screws are provided at 8f and 8g with respective motors 8h and 8i to drive the vertically displaceable carriages 11. The motor driving the lead screw 8d is represented at 8j.

The programmed controller 10, i.e. the CNC, of course controls the motors 8h through 8j as well as the various drive motors 8b from the drill bits and the units 8a for advancing the drill bits toward the flanges and web of the I-beam.

Each of the carriages 11 is displaceable on a respective pair of guide rolls 12.

In the embodiment illustrated, a pair of such drill bits are provided on the carriages of each of the vertical members 3 to drill holes in the flanges of the I-beam in accordance with the preprogrammed pattern while the horizontally shiftable carriage has drill bits 9 for producing pairs of holes in the web of the I-beam in accordance with the predetermined pattern.

Figure 2:
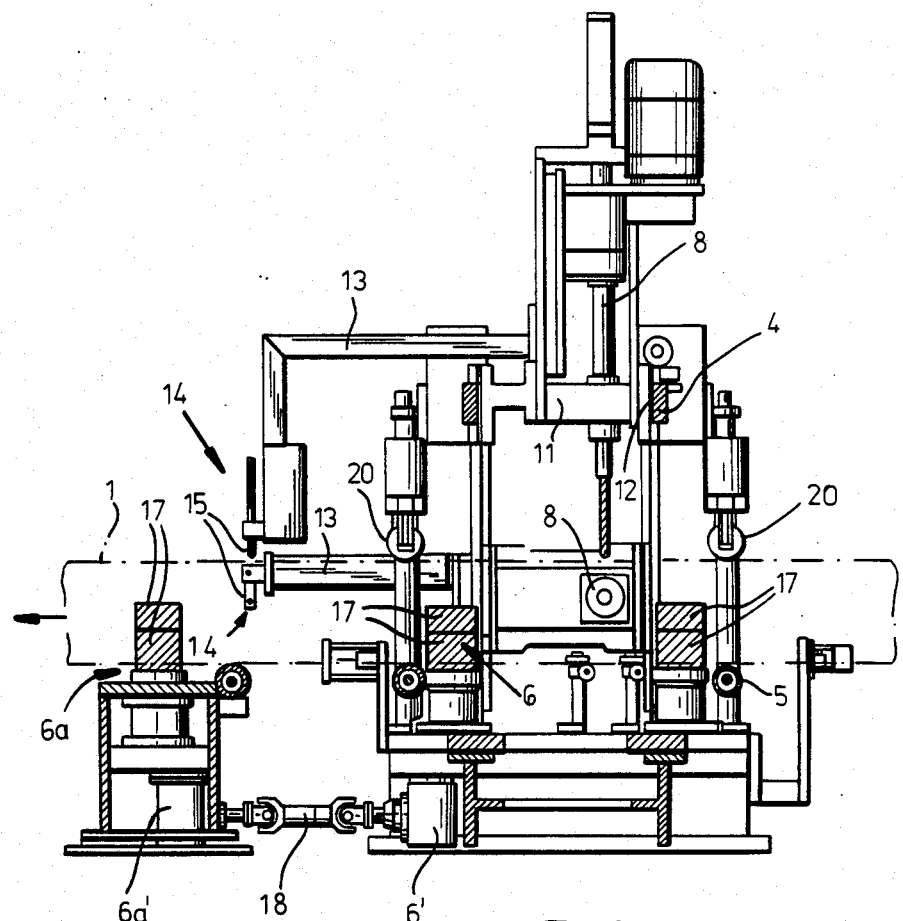
FIG. 2 is a section taken along the line II—II of FIG. 1.

In the machine illustrated, moreover, each of the carriages 11 is provided with a cantilever arm 13 which is rigidly fixed to the respective carriage 11 and extends downwardly in the direction of feed as best seen in FIGS. 1 and 2.

Each cantilever arm 13 carries a burning unit 14 with a cutting burner 15 which can be supplied in a conventional manner with a cutting oxygen to reduce the cutting form and can be operated by controller 10 to cut off the supply and deliver only cutting oxygen to the burner 15.

With respect to the feed direction, behind the cutting tools, i.e. after the cutting tools have been effective, the workpiece encounters a further feed unit 6a which is driven synchronously with the feed unit 6 and is provided with a further displacement measurement unit 7a providing a pulse input to the controller 10.

Controller 10, as noted, can provide the input to the burner units 14 to initiate and terminate the cutting operations.

Each of the displacement measuring units 7, 7a can comprise a respective measuring disc 16 or 16a, a rotation of which generates a pulse output. In the embodiment illustrated and as can be seen from FIG. 1, two such discs 16, before and after of the drilling bits, engage the I-beam 1 and provide inputs to the controller 10 which, in response to these inputs, operates the drive 6 and the drilling units.

In addition to these discs, a further disc 16a is provided to allow the controller 10 to operate the feeder 6a for cutting operations at the drilling end of the I-beam and even for cutout operations when the I-beam is to be separated by the burner into two sections.

The drive 6a and 6 is synchronized by a universal joint shaft 18 interconnecting the transmissions 6a' and 6' of the drives 6.

As can be seen from FIG. 4, moreover, for exact positioning at the cutting burners in the horizontal direction, each of the burners can be mounted on a slide 19a forming a nut engaged by a screw 19 rotated by the handle 19b to displace the burner as represented by the double-headed arrow in FIG. 4.

The I-beam 1 is also engaged from above by hold-down rollers 20.

In operation, as the I-beam passes through the frame 2, driven by the drive 6 and under the control of the program controller 10, it is temporarily immobilized whenever holes are required and these holes are drilled in the usual manner at locations and patterns determined by the programmed instructions, the position of each hole being determined by the position of the I-beam in the rame as detected by the measuring wheel 16. At the leading end and along the I-beam, moreover, the programmer 10 may effect cutting operations by the burners to produce cutouts to webs or otherwise shape the flanges and web or to otherwise change the shape of the I-beam as required.

After the trailing end of the I-beam leaves the frame 2, it continues to be driven by the drive 6a which is synchronized with the drive 6 and thus under the control of the NC unit 10, the position now being detected by the disc 16a. During this period the I-beam can be stopped or can continue to move while the burners make preprogrammed cuts.

I claim:

1. An apparatus for drilling and cutting a structural steel shape comprising:
    a portal-like machine frame having a pair of vertical frame members adapted to flank an elongated workpiece and a yoke member extending over said workpiece;
    a roller conveyor carrying said workpiece on a linear path through said frame;
    a first drive engaging said workpiece at said frame for displacing said workpiece linearly in a feed direction;
    a first displacement-measurement unit engaging said workpiece for generating signals representing the position of said workpiece in said frame;
    a respective carriage displaceable on each of said frame members including a carriage on said yoke member and provided with at least one drill having a drill bit for boring said workpiece;
    a respective cantilever arm fixed at one end to each of said carriages and extending in said direction from said frame;
    a respective cutting burner on an opposite end of said arm and spaced downstream of the respective drill in said direction while being juxtaposable with said workpiece for burner cutting pattern therein;
    a second drive engageable with said workpiece at a location spaced from said carriage in said direction for displacing said workpiece after it passes said bit, each of said cantilever arms projecting from said carriage in the direction of said location and reaching substantially to said location;
    a second displacement-measurement unit engaging said workpiece at said location for generating signals representing the position of said workpiece at said location;
    a preprogrammed controller connected to said drives, said drill, and said burners and responsive to inputs from said units for the controlled drilling and burner cutting of said workpiece; and
    mechanical means coupling said drives for synchronizing said drives.

2. The apparatus defined in claim 1 wherein said means for synchronizing said drives is a universal joint shaft.

* * * * *